US012727711B2

(12) United States Patent
White, Sr.

(10) Patent No.: US 12,727,711 B2
(45) Date of Patent: Sep. 8, 2026

(54) BEVERAGE HEATING RECEPTACLE DEVICE

(71) Applicant: Leslie White, Sr., Houston, TX (US)

(72) Inventor: Leslie White, Sr., Houston, TX (US)

( * ) Notice: Subject to any disclaimer, the term of this patent is extended or adjusted under 35 U.S.C. 154(b) by 1174 days.

(21) Appl. No.: 17/582,834

(22) Filed: Jan. 24, 2022

(65) Prior Publication Data

US 2023/0233018 A1 Jul. 27, 2023

(51) Int. Cl.

| | |
|---|---|
| ***A47J 36/24*** | (2006.01) |
| ***A47J 36/32*** | (2006.01) |
| ***H02J 7/70*** | (2026.01) |
| ***H02J 50/10*** | (2016.01) |
| ***H05B 1/02*** | (2006.01) |

(52) U.S. Cl.

CPC ......... *A47J 36/2472* (2013.01); *A47J 36/321* (2018.08); *H02J 7/70* (2026.01); *H02J 50/10* (2016.02); *H05B 1/0269* (2013.01)

(58) Field of Classification Search

CPC .... A47J 36/14; A47J 36/2416; A47J 36/2433; A47J 36/2444; A47J 36/2461; A47J 36/2466; A47J 36/2472; A47J 36/2483; A47J 36/2494; A47J 36/26; A47J 36/32; A47J 36/321; A47J 41/0044; A47J 41/005; A47J 41/0094; H02J 7/00; H02J 7/00034; H02J 7/0013; H02J 7/00302; H02J 7/0042; H02J 7/0044; H02J 50/10; H02J 50/12; H05B 1/0225; H05B 1/0244; H05B 1/0269; H05B 3/0014; H05B 3/06; H05B 3/26; H05B 3/283; H05B 3/30; H05B 3/48; H05B 3/68; H05B 3/683; H05B 3/82; H05B 2203/013; H05B 2203/017; H05B 2203/021

See application file for complete search history.

(56) References Cited

U.S. PATENT DOCUMENTS

| | | | | |
|---|---|---|---|---|
| 3,931,494 A * | 1/1976 | Fisher | A47J 36/2461 219/521 |
| D336,825 S | 6/1993 | Ivey | |
| 6,013,901 A | 1/2000 | Lavoie | |
| 6,072,161 A | 6/2000 | Stein | |
| 9,642,191 B2 * | 5/2017 | Everett, Jr. | A47J 27/21191 |
| 10,219,647 B2 | 3/2019 | Richardson | |
| 10,383,476 B2 | 8/2019 | Alexander | |

(Continued)

FOREIGN PATENT DOCUMENTS

| | | |
|---|---|---|
| CA | 2596493 | 1/2009 |
| CN | 213341621 U * | 6/2021 |

*Primary Examiner* — Hung D Nguyen

(57) ABSTRACT

A beverage heating receptacle device for heating a beverage includes a shell, which defines an interior space and which is formed to define a receptacle having an annular sidewall that extends from a bottom to an open top. A beverage is positionable in the receptacle. A heating element is engaged to the shell and is positioned in the interior space proximate to an inner section of the annular sidewall and an upper section of the bottom. A base is selectively engageable to the receptacle so that the base extends from the bottom. A battery is positioned in the base and is operationally engaged to the heating element upon engagement of the base to the receptacle. The battery thus is enabled to selectively power the heating element to heat the beverage.

17 Claims, 6 Drawing Sheets

(56) References Cited

U.S. PATENT DOCUMENTS

| | | | | |
|---|---|---|---|---|
| 2015/0245723 | A1* | 9/2015 | Alexander | A47J 39/025<br>219/387 |
| 2019/0239682 | A1* | 8/2019 | Lee | A47G 19/2272 |
| 2019/0290038 | A1 | 9/2019 | Huang | |
| 2019/0357707 | A1* | 11/2019 | Bugaj | A47G 19/2227 |
| 2020/0178726 | A1 | 6/2020 | Wilbourn | |

* cited by examiner 22
66
64
34
32
12
16
18
36
10
48
20
40
44
42
74
52
54
46
62
58
38
60
58
56
56
60

12
32
14
28
26
64
26
18
28
32
30
26
48
50

BEVERAGE HEATING RECEPTACLE DEVICE

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

The disclosure relates to receptacle devices and more particularly pertains to a new receptacle device for heating a beverage. The present invention discloses a receptacle device comprising an insulated mug with heating elements in both its bottom and sidewall, which are powered by a rechargeable battery positioned in a removable base.

(2) Description of Related Art Including Information Disclosed Under 37 CFR 1.97 and 1.98

The prior art relates to receptacle devices. Prior art receptacle devices may comprise cups having heated bases, heated bottoms, or heated sidewalls. What is lacking in the prior art is a beverage receptacle comprising an insulated mug with heating elements in both its bottom and sidewall, which are powered by a rechargeable battery positioned in a removable base.

(h) BRIEF SUMMARY OF THE INVENTION

An embodiment of the disclosure meets the needs presented above by generally comprising a shell, which defines an interior space and which is formed to define a receptacle having an annular sidewall that extends from a bottom to an open top. The receptacle is configured for positioning of a beverage. A heating element is engaged to the shell and is positioned in the interior space proximate to an inner section of the annular sidewall and an upper section of the bottom. A base is selectively engageable to the receptacle so that the base extends from the bottom. A battery is positioned in the base and is configured to operationally engage the heating element upon engagement of the base to the receptacle. The battery thus is enabled to selectively power the heating element. The heating element is configured to heat the beverage.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
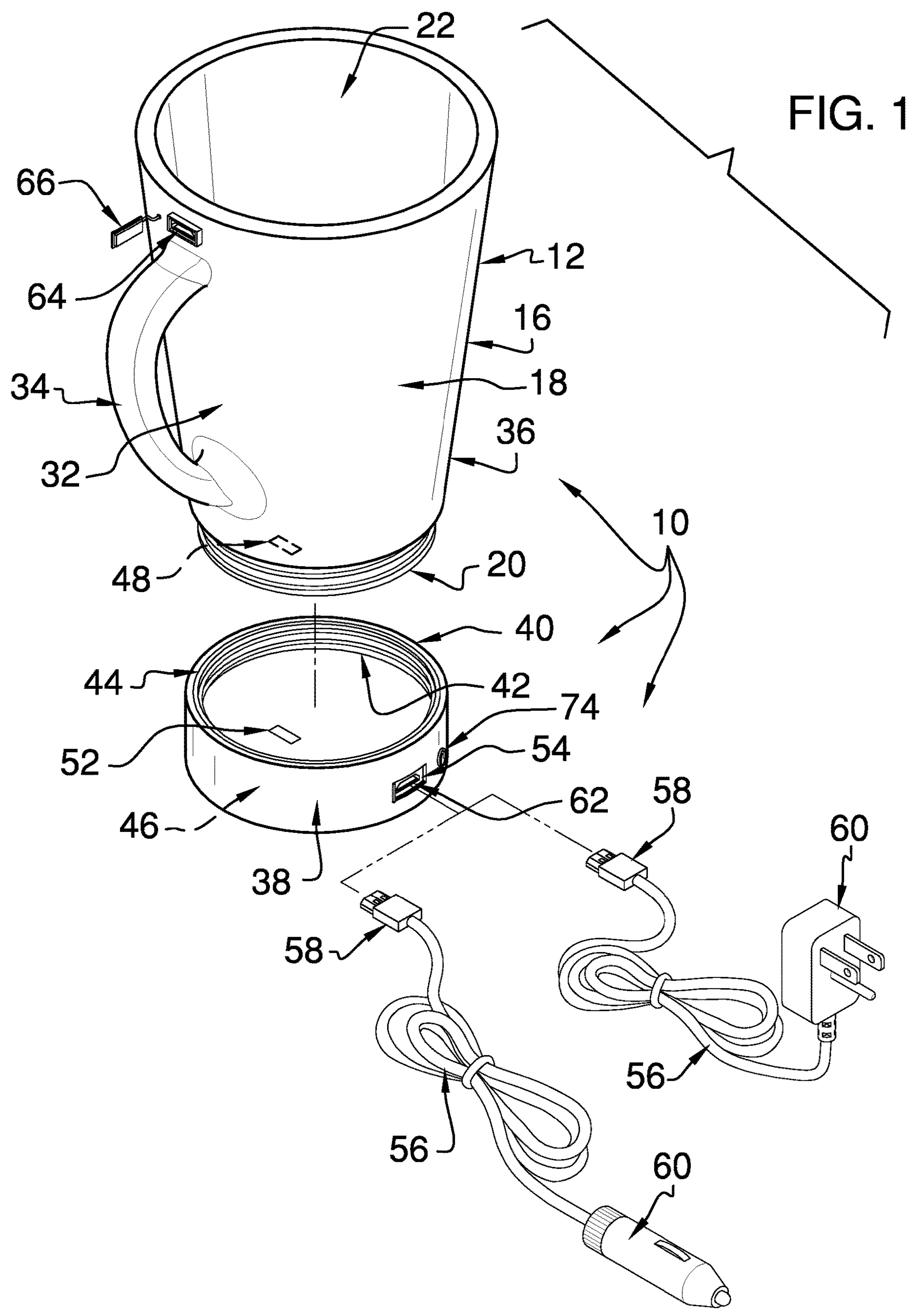
FIG. 1 is an isometric perspective view of a beverage heating receptacle device according to an embodiment of the disclosure.

With reference now to the drawings, and in particular to FIGS. 1 through 6 thereof, a new receptacle device embodying the principles and concepts of an embodiment of the disclosure and generally designated by the reference numeral 10 will be described.

Figure 2:
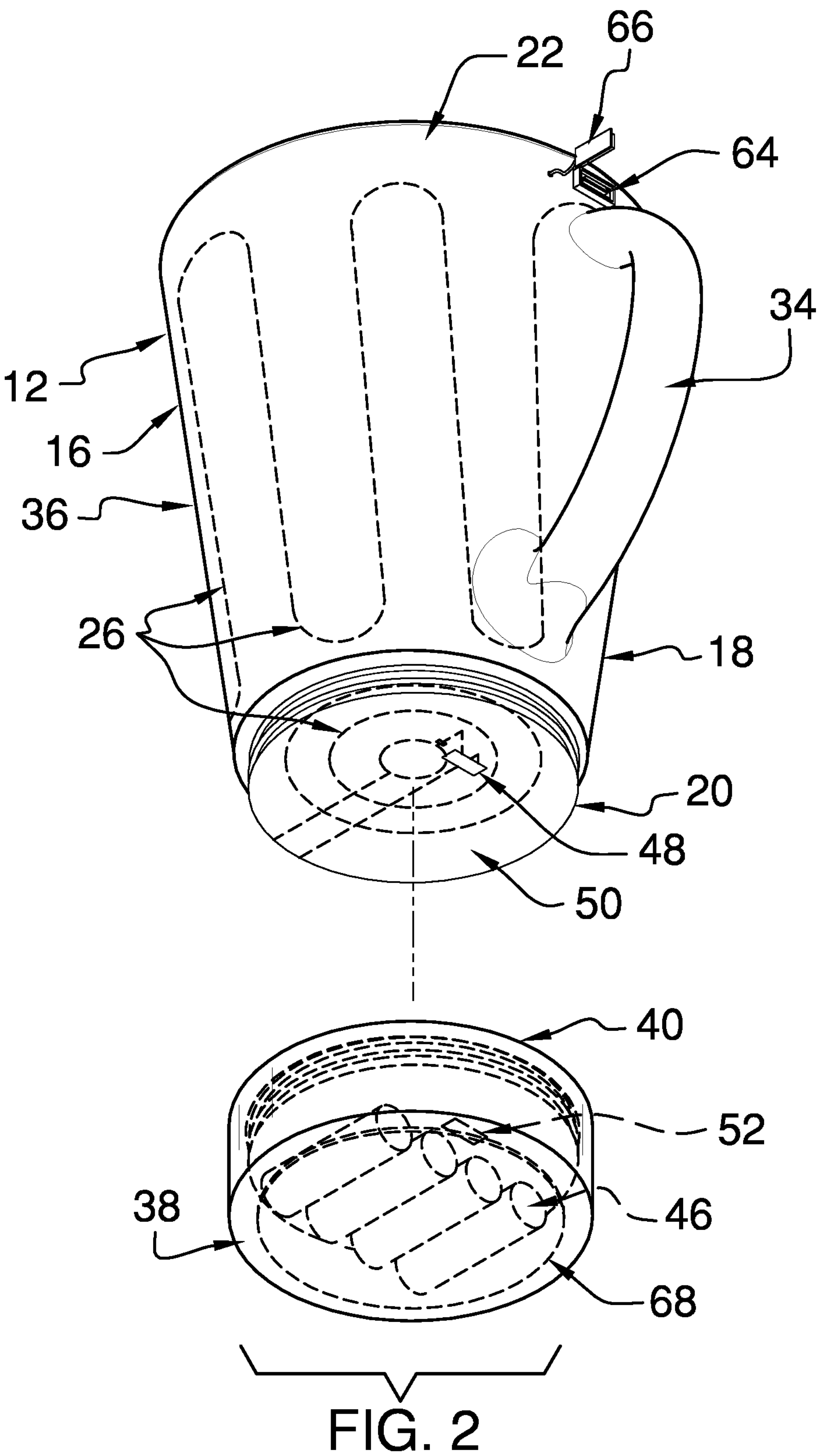
FIG. 2 is an isometric perspective view of an embodiment of the disclosure.
Figure 3:
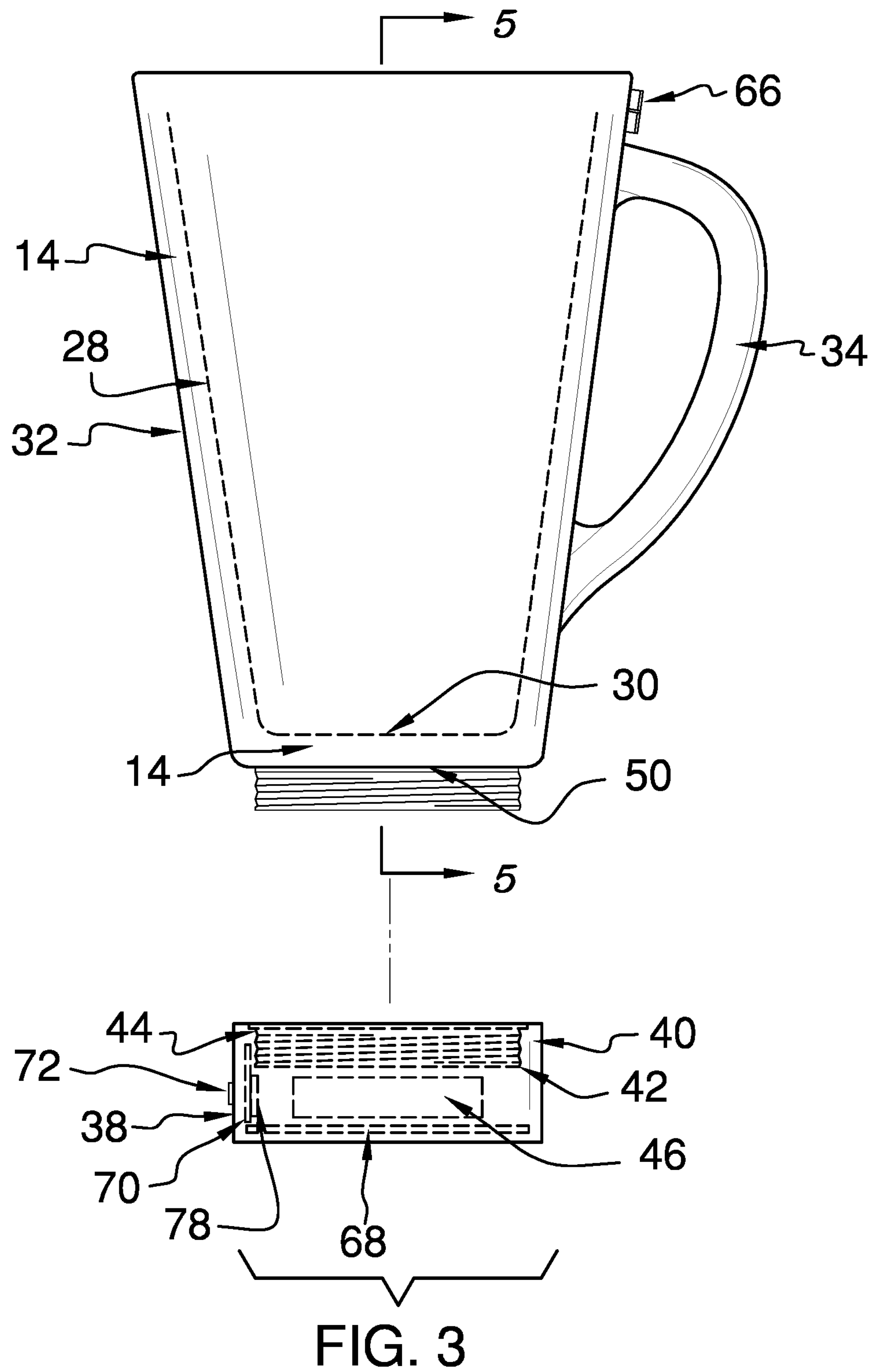
FIG. 3 is a side view of an embodiment of the disclosure.
Figure 4:
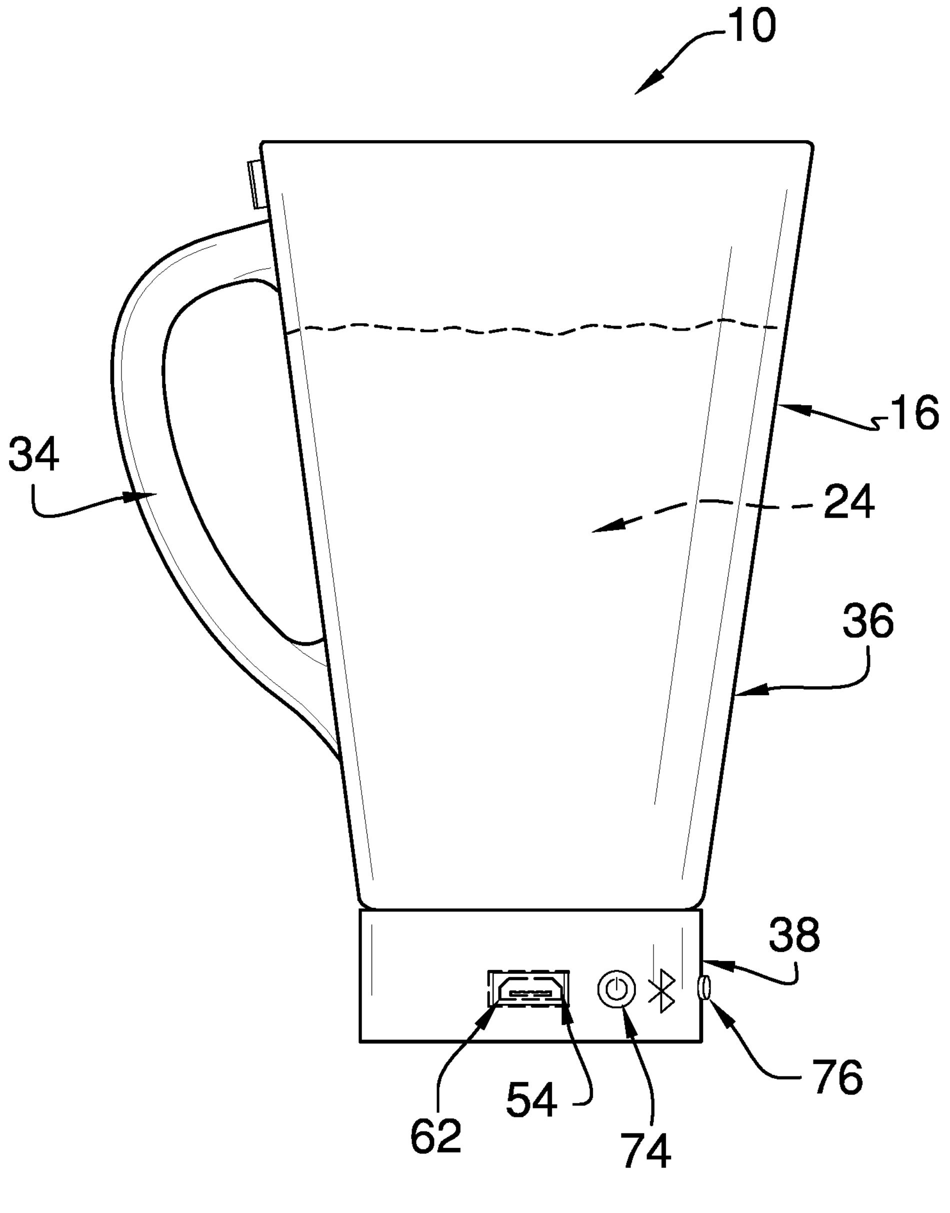
FIG. 4 is an in-use view of an embodiment of the disclosure.
Figure 5:
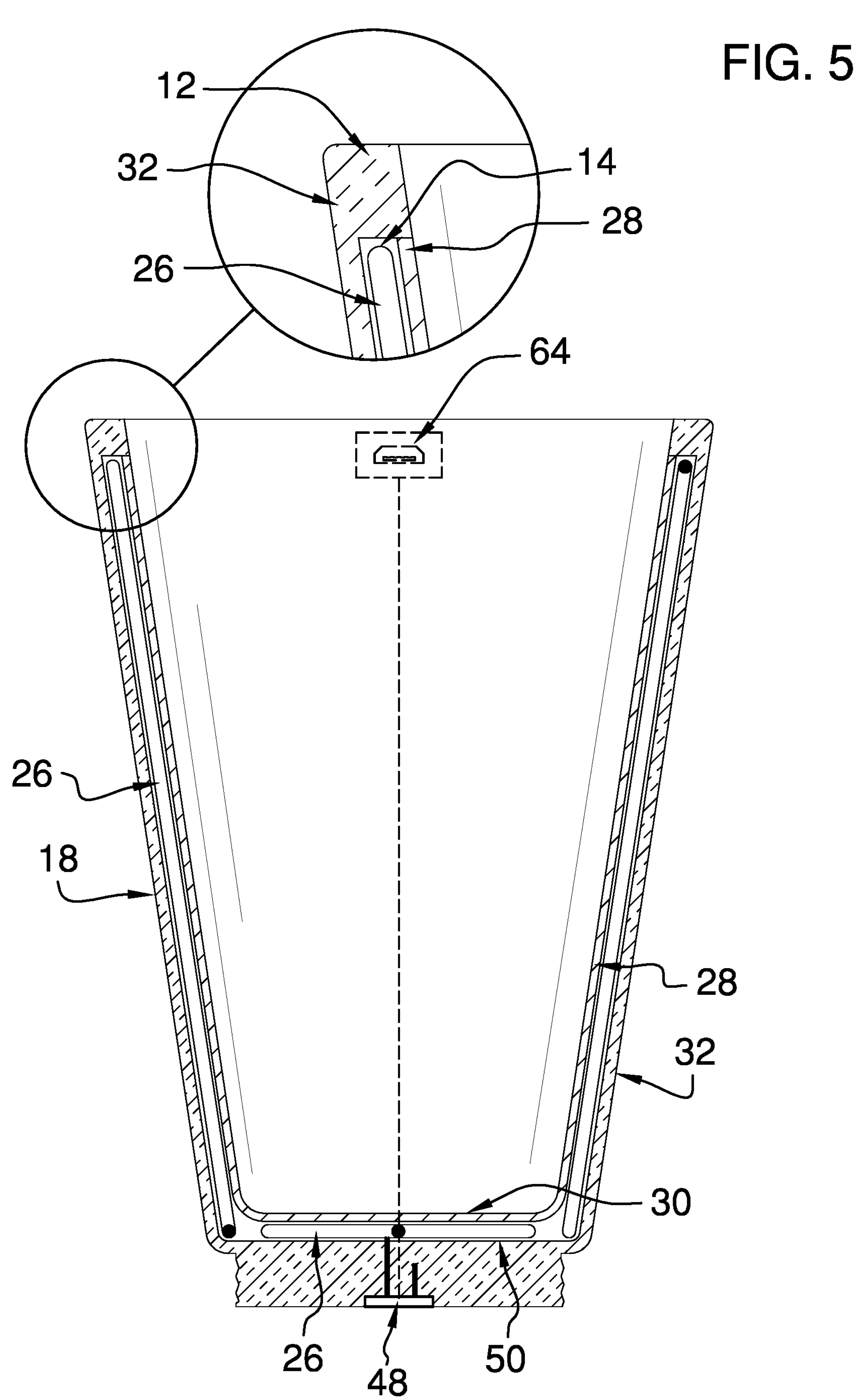
FIG. 5 is a cross-sectional view of an embodiment of the disclosure.
Figure 6:
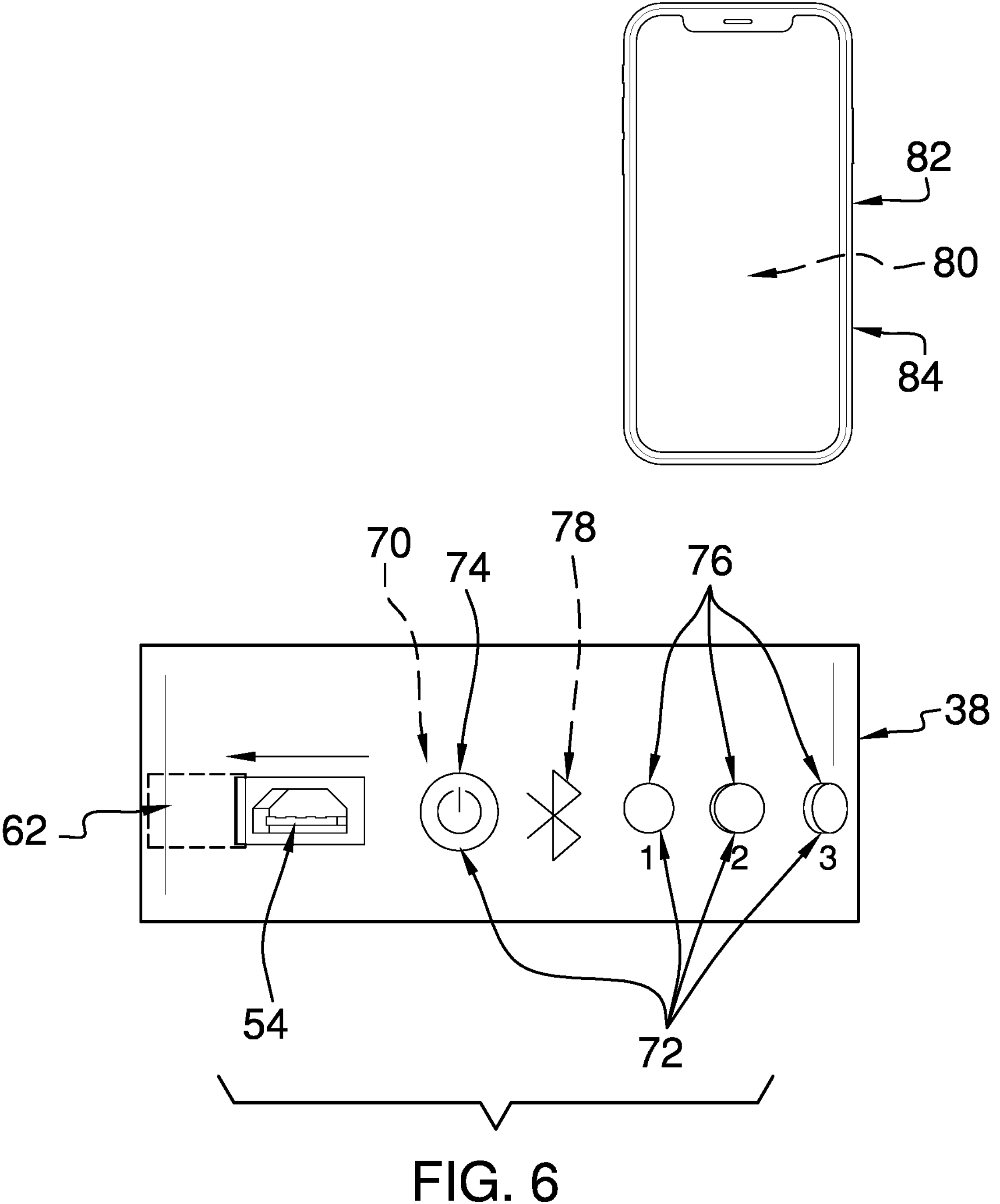
FIG. 6 is a detail view of an embodiment of the disclosure.

As best illustrated in FIGS. 1 through 6, the beverage heating receptacle device 10 generally comprises a shell 12, which defines an interior space 14 and which is formed to define a receptacle 16 having an annular sidewall 18 that extends from a bottom 20 to an open top 22. The receptacle 16 is configured for positioning of a beverage 24, as shown in FIG. 4.

The bottom 20 is circular. The annular sidewall 18 may extend transversely from the bottom 20 so that the receptacle 16 is substantially inverted conical frustum shaped. The receptacle 16 is externally threaded adjacent to the bottom 20, as shown in FIG. 3. The present invention also anticipates the receptacle 16 being cylindrically shaped.

A heating element 26 is engaged to the shell 12 and is positioned in the interior space 14. As shown in FIG. 3, the heating element 26 is positioned proximate to an inner section 28 of the annular sidewall 18 and an upper section 30 of the bottom 20. As shown in FIG. 4, an outer section 32 of the annular sidewall 18 comprises insulation and is configured to deter heat transfer between the beverage 24 and the ambient environment. The present invention also anticipates the interior space 14 that is not occupied by the heating element 26 being evacuated or comprising insulation.

A handle 34 is engaged to and extends from an outer section 32 of the annular sidewall 18. Thus, the shell 12 is formed as a mug 36. The handle 34 is configured to be grasped in a hand of a user, positioning the user to lift the receptacle 16 and the beverage 24.

A base 38 is selectively engageable to the receptacle 16 so that the base 38 extends from the bottom 20. The base 38 is disc shaped. As shown in FIG. 3, a rim 40 is engaged to and extends from an upper perimeter 42 of the base 38. The rim 40 is internally threaded so that the rim 40 is complementary to the bottom 20 of the receptacle 16. The base 38 is selectively threadedly engageable to the bottom 20 of the receptacle 16. A gasket 44 is engaged to one of the rim 40 and the receptacle 16 so that the gasket 44 is sealably compressed between the rim 40 and the receptacle 16 upon engagement of the base 38 to the receptacle 16.

A battery 46, which is rechargeable, is positioned in the base 38 and is configured to operationally engage the heating element 26 upon engagement of the base 38 to the receptacle 16. As shown in FIG. 2, a first connector 48 is engaged to a lower section 50 of the bottom 20 and is operationally engaged to the heating element 26. A second connector 52 is engaged to the base 38 and is operationally engaged to the battery 46. The second connector 52 engages the first connector 48 upon engagement of the base 38 to the receptacle 16. The battery 46 thus is enabled to selectively power the heating element 26. The heating element 26 is configured to heat the beverage 24.

As shown in FIG. 1, the beverage heating receptacle device 10 also comprises a first port 54 and a charging cord 56. The first port 54 is engaged to the base 38 and is operationally engaged to the battery 46. The charging cord 56 comprises a first plug 58 and a second plug 60. The first plug 58 is complementary to the first port 54. The second plug 60 is complementary to an electrical outlet or to an automobile auxiliary power outlet. The first plug 58 is selectively insertable into the first port 54. The second plug 60 is configured for insertion into the electrical outlet or the automobile auxiliary power outlet to operationally engage the battery 46 to a source of electrical current to charge the battery 46.

A first cover 62 is tethered to the base 38 proximate to the first port 54. The first cover 62 is selectively engageable to the base 38 to close the first port 54. The beverage heating receptacle device 10 also may comprise a second port 64, which is engaged to the mug 36 proximate to the handle 34. When the mug 36 is engaged to the base 38, the second port 64 is operationally engaged to the battery 46. The second port 64 thus can be used to charge the battery 46 when the base 38 is positioned in a cupholder. A second cover 66 is tethered to the mug 36 proximate to the second port 64. The second cover 66 is selectively engageable to the mug 36 to close the second port 64.

A receiver coil 68 is engaged to the base 38 and is operationally engaged to the battery 46. The receiver coil 68 is configured to interact with an alternating electromagnetic field to generate an electrical current to charge the battery 46.

A microprocessor 70 is positioned in the base 38 and is operationally engaged to the battery 46 and the heating element 26. A controller 72 is engaged to the base 38 and is operationally engaged to the microprocessor 70. The controller 72 is configured for entry of commands into the microprocessor 70 for selectively powering the heating element 26 for adjusting the temperature of the beverage 24 positioned in the receptacle 16. The controller 72 may comprise a power button 74 and a plurality of temperature buttons 76, wherein each temperature button 76 corresponds to a respective target temperature for the beverage 24.

The present invention also anticipates a receiver 78 engaged to the base 38 and operationally engaged to the microprocessor 70. Programming code 80 is selectively positionable on an electronic device 82 of the user, such as a smartphone 84, to enable the user to wirelessly enter commands into the microprocessor 70 to select a respective target temperature for the beverage 24.

In use, the base 38 is engaged to the receptacle 16 so the battery 46 is operationally engaged to the heating element 26. A beverage 24 then is positioned in the receptacle 16 and is heated by the heating element 26.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A beverage heating receptacle device comprising:

a shell defining an interior space and being formed to define a receptacle having an annular sidewall extending from a bottom to an open top, wherein the receptacle is configured for positioning of a beverage;

a heating element engaged to the shell and positioned in the interior space proximate to an inner section of the annular sidewall and an upper section of the bottom;

a base selectively engageable to the receptacle such that the base extends from the bottom;

a battery positioned in the base and being configured for operationally engaging the heating element upon engagement of the base to the receptacle, enabling the battery for selectively powering the heating element, wherein the heating element is configured for heating the beverage, the battery being rechargeable;

a first port engaged to the base and being operationally engaged to the battery; and a second port engaged to the receptacle, the second port being positioned vertically spaced and aligned above a handle of the receptacle, such that when the shell is engaged to the base the second port is operationally engaged to the battery, wherein the second port is available to charge the battery when the base is positioned in a cupholder.

2. The beverage heating receptacle device of claim 1, wherein the bottom is circular.

3. The beverage heating receptacle device of claim 2, wherein the annular sidewall extends transversely from the bottom, such that the receptacle is substantially inverted conical frustum shaped.

4. The beverage heating receptacle device of claim 2, further including:

the receptacle being externally threaded adjacent to the bottom;

the base being disc shaped; and a rim engaged to and extending from an upper perimeter of the base, the rim being internally threaded, such that the rim is complementary to the bottom of the receptacle, such that the base is selectively threadedly engageable to the bottom of the receptacle.

5. The beverage heating receptacle device of claim 4, further including a gasket engaged to one of the rim and the receptacle, such that the gasket is sealably compressed between the rim and the receptacle upon engagement of the base to the receptacle.

6. The beverage heating receptacle device of claim 1, wherein an outer section of the annular sidewall comprises insulation, wherein the outer section is configured for deterring heat transfer between the beverage and the ambient environment.

7. The beverage heating receptacle device of claim 1, wherein the shell is formed as a mug.

8. The beverage heating receptacle device of claim 7, further including a charging cord comprising a first plug and a second plug, the first plug being complementary to the first port, the second plug being complementary to an electrical outlet or to an automobile auxiliary power outlet, such that the first plug is selectively insertable into the first port, wherein the second plug is configured for insertion into the electrical outlet or the automobile auxiliary power outlet for operationally engaging the battery to a source of electrical current for charging the battery.

9. The beverage heating receptacle device of claim 8, further including a first cover tethered to the base proximate to the first port, the first cover being selectively engageable to the base to close the first port.

10. The beverage heating receptacle device of claim 9, further including a second cover tethered to the mug proximate to the second port, the second cover being selectively engageable to the mug to close the second port.

11. The beverage heating receptacle device of claim 1, further including the handle engaged to and extending from an outer section of the annular sidewall, wherein the handle is configured for grasping in a hand of a user, positioning the user for lifting the receptacle and the beverage.

12. The beverage heating receptacle device of claim 1, further including a receiver coil engaged to the base and operationally engaged to the battery, wherein the receiver coil is configured for interacting with an alternating electromagnetic field to generate an electrical current for charging the battery.

13. The beverage heating receptacle device of claim 1, further including:

a microprocessor positioned in the base and operationally engaged to the battery and the heating element;

a controller engaged to the base and operationally engaged to the microprocessor, the controller being configured for entry of commands into the microprocessor for selectively powering the heating element for adjusting the temperature of the beverage positioned in the receptacle.

14. The beverage heating receptacle device of claim 13, wherein the controller comprises a power button and a plurality of temperature buttons, wherein each temperature button corresponds to a respective target temperature for the beverage.

15. The beverage heating receptacle device of claim 13, further including:

a receiver engaged to the base and operationally engaged to the microprocessor; and programming code selectively positionable on an electronic device of the user for enabling the user to wirelessly enter commands into the microprocessor to select a respective target temperature for the beverage.

16. The beverage heating receptacle device of claim 1, further including:

a first connector engaged to a lower section of the bottom and being operationally engaged to the heating element; and a second connector engaged to the base and being operationally engaged to the battery, such that the second connector engages the first connector upon engagement of the base to the receptacle.

17. A beverage heating receptacle device comprising:

a shell defining an interior space and being formed to define a receptacle having an annular sidewall extending from a bottom to an open top, wherein the receptacle is configured for positioning of a beverage, the bottom being circular, the annular sidewall extending transversely from the bottom, such that the receptacle is substantially inverted conical frustum shaped, the receptacle being externally threaded adjacent to the bottom, an outer section of the annular sidewall comprising insulation, wherein the outer section is configured for deterring heat transfer between the beverage and the ambient environment, the shell being formed as a mug;

a heating element engaged to the shell and positioned in the interior space proximate to an inner section of the annular sidewall and an upper section of the bottom;

a handle engaged to and extending from the outer section of the annular sidewall, wherein the handle is configured for grasping in a hand of a user, positioning the user for lifting the receptacle and the beverage;

a base selectively engageable to the receptacle such that the base extends from the bottom, the base being disc shaped;

a rim engaged to and extending from an upper perimeter of the base, the rim being internally threaded, such that the rim is complementary to the bottom of the receptacle, such that the base is selectively threadedly engageable to the bottom of the receptacle;

a gasket engaged to one of the rim and the receptacle, such that the gasket is sealably compressed between the rim and the receptacle upon engagement of the base to the receptacle;

a battery positioned in the base and being configured for operationally engaging the heating element upon engagement of the base to the receptacle, enabling the battery for selectively powering the heating element, wherein the heating element is configured for heating the beverage, the battery being rechargeable;

a first port engaged to the base and being operationally engaged to the battery;

a first cover tethered to the base proximate to the first port, the first cover being selectively engageable to the base to close the first port;

a charging cord comprising a first plug and a second plug, the first plug being complementary to the first port, the second plug being complementary to an electrical outlet or to an automobile auxiliary power outlet, such that the first plug is selectively insertable into the first port, wherein the second plug is configured for insertion into the electrical outlet or the automobile auxiliary power outlet for operationally engaging the battery to a source of electrical current for charging the battery;

a second port engaged to the mug, the second port being positioned vertically spaced and aligned above the handle, such that when the shell is engaged to the base the second port is operationally engaged to the battery, wherein the second port is available to charge the battery when the base is positioned in a cupholder;

a second cover tethered to the mug proximate to the second port, the second cover being selectively engageable to the mug to close the second port;

a first connector engaged to a lower section of the bottom and being operationally engaged to the heating element;

a second connector engaged to the base and being operationally engaged to the battery, such that the second connector engages the first connector upon engagement of the base to the receptacle;

a receiver coil engaged to the base and operationally engaged to the battery, wherein the receiver coil is configured for interacting with an alternating electromagnetic field to generate an electrical current for charging the battery;

a microprocessor positioned in the base and operationally engaged to the battery and the heating element;

a controller engaged to the base and operationally engaged to the microprocessor, the controller being configured for entry of commands into the microprocessor for selectively powering the heating element for adjusting the temperature of the beverage positioned in the receptacle, the controller comprising a power button and a plurality of temperature buttons, wherein each temperature button corresponds to a respective target temperature for the beverage;

a receiver engaged to the base and operationally engaged to the microprocessor; and programming code selectively positionable on an electronic device of the user for enabling the user to wirelessly enter commands into the microprocessor to select a respective target temperature for the beverage.

* * * * *